US006539076B1

(12) United States Patent
Shoji (10) Patent No.: US 6,539,076 B1
(45) Date of Patent: Mar. 25, 2003

(54) METHOD AND APPARATUS FOR PHOTOGRAPHING A RADIATION IMAGE

(75) Inventor: Takashi Shoji, Kaisei-machi (JP)

(73) Assignee: Fuji Photo Film Co., Ltd., Kanagawa-Ken (JP)

( * ) Notice: Subject to any disclaimer, the term of this patent is extended or adjusted under 35 U.S.C. 154(b) by 0 days.

(21) Appl. No.: 09/505,769

(22) Filed: Feb. 17, 2000

(30) Foreign Application Priority Data

Feb. 17, 1999  (JP) .......................................... 11-038662

(51) Int. Cl.[7] ................................................ H05G 1/64
(52) U.S. Cl. ................. 378/98.8; 378/98.2; 250/370.09
(58) Field of Search ............................... 378/98.8, 98.2; 250/370.09, 370.11, 371, 591

(56) References Cited

U.S. PATENT DOCUMENTS

| | | | |
|---|---|---|---|
| 4,689,487 A | 8/1987 | Nishiki et al. | .......... 250/361 R |
| 4,803,359 A | 2/1989 | Hosoi et al. | ............. 250/372.2 |
| 5,187,369 A | 2/1993 | Kingsley et al. | ........ 250/370.11 |
| 5,276,313 A | 1/1994 | Nakazawa et al. | |
| 5,354,982 A | 10/1994 | Nelson et al. | ......... 250/214 LA |
| 5,514,873 A | 5/1996 | Schulze-Ganzlin et al. | . 250/394 |
| 5,818,898 A | 10/1998 | Tsukamoto et al. | |
| 6,169,287 B1 * | 1/2001 | Warburton | ............. 250/370.09 |
| 6,185,274 B1 * | 2/2001 | Kinno et al. | ............ 250/370.07 |

FOREIGN PATENT DOCUMENTS

| | | | | |
|---|---|---|---|---|
| EP | 0 792 065 A2 | 8/1997 | | |
| JP | 59-211263 | 11/1984 | ........... | H01L/27/14 |
| JP | 61-244176 | 10/1986 | ............ | H04N/5/32 |
| JP | 1-216290 | 8/1989 | ............ | G01T/1/24 |
| JP | 2-164067 | 6/1990 | ......... | H01L/27/146 |
| JP | 8-299316 | 11/1996 | ............ | A61B/6/00 |
| JP | 9-206293 | 8/1997 | ............ | A61B/6/00 |
| JP | 10-232824 | 9/1998 | ........... | G06F/12/06 |
| JP | 10-271374 | 10/1998 | .......... | H04N/5/225 |
| WO | WO 92/06501 | 4/1992 | ........... | H01L/27/14 |

OTHER PUBLICATIONS

"Signal, noise, and readout considerations in the development of amorphous silicon photodiode arrays for radiotherapy and diagnostic x-ray imaging" Antonuk et al., SPIE vol. 1443 Medical Imaging V: Image Physics (1991) pp. 108–119.

"Material Parameters in Thick Hydrogenated Amorphous Silicon Radiation Detectors", Qureshi et al., Lawrence Berkeley Laboratory, University of California, Berkeley CA.

"Metal/Amorphous Silicon Miltilayer Radiation Detectors", Naruse et al., IEEE Transactions on Nuclear Science, vol. 36, No. 2, Apr. 1989, pp. 1347–1352.

"Method and device for recording and transducing an electromagnetic energy pattern", Research Disclosure, Jun. 1983 pp. 229–231.

* cited by examiner

Primary Examiner—Drew A. Dunn
Assistant Examiner—Pamela R. Hobden
(74) Attorney, Agent, or Firm—Sughrue Mion, PLLC (57) ABSTRACT

A radiation-image photographing apparatus is provided with a voltage controlling switch 52 for switching voltage which is applied from a power source 53 to a detector 10, a high-voltage generator 62 for supplying high voltage HV to a radiation source 61, and a control section 70 for controlling a light-source control section 40. When a generator switch 63a is on, the high-voltage generator 62 generates high voltage HV. The control section 70 senses that a signal S1 has gone low and makes a signal C2 high, whereby dc voltage is applied to the detector 10. After $t_{p1}$ has elapsed since the signal C2 was made high, the control section 70 makes a signal C1 low, thereby causing the light-source control section 40 to be in a preexposure mode. After $t_{p3}$ has elapsed since the emission of preexposure light P was started, the control section 70 makes a signal C3 high, thereby causing the radiation source 61 to emit radiation R. After $t_{e3}$ has elapsed since the emission of radiation R was started, the control section 70 causes the signal C2 to be in a high impedance state, thereby stopping the application of voltage to the detector 10.

11 Claims, 7 Drawing Sheets

METHOD AND APPARATUS FOR PHOTOGRAPHING A RADIATION IMAGE

BACKGROUND OF THE INVENTION

1. Field of the Invention

This invention relates generally to a method and apparatus for photographing a radiation image, and more particularly to a radiation-image photographing method and apparatus that obtains the radiation-image information of a subject by detecting radiation transmitted through the subject with a solid radiation detector.

2. Description of the Related Art

Today, in the field of radiation photography with the object of medical analysis and the like, a wide variety of radiation-image photographing apparatuses have been proposed and put to practical use (see U.S. Pat. Nos. 5,514,873 and 5,354,982, Japanese Unexamined Patent Publication No. 8(1996)-299316, etc.). In the radiation-image photographing apparatus, radiation transmitted through a subject is detected by a solid radiation detector (which has a semiconductor as a major part and will also be hereinafter referred to simply as a detector) in order to obtain an image signal representative of a radiation image related to the subject.

Also, various types of solid radiation detectors to be used in the radiation-image photographing apparatus have been proposed. For instance, with respect to the charge-generating process of converting radiation to an electric charge, there is a solid radiation detector of light conversion type (see Japanese Unexamined Patent Publication Nos. 59(1984)-211263 and 2(1990)-164067, PCT International Publication No. WO 92/06501, SPIE Vol. 1443, "Medical Image V," Image Physics (1991), pp. 108–119, etc.). In this type of detector, a fluorescent substance is irradiated with radiation and emits fluorescent light. The fluorescent light is detected by a photoelectric conversion element (which is a solid detector). The resultant signal charge is temporarily stored in the electricity storage portion of the photoelectric conversion element, and the stored charge is converted to an image signal (electric signal) and is output. There is also a solid radiation detector of direct conversion type (see "MATERIAL PARAMETERS IN THICK HYDROGENATED AMORPHOUS SILICON RADIATION DETECTOR," Lawrence Berkeley Laboratory and University of California, Berkeley, Calif. 94720 Xerox Parc, Palo Alto, Calif. 94304, "Metal/Amorphous Silicon Multilayer Radiation Detectors," IEE TRANSACTION ON NUCLEAR SCIENCE, Vol. 36, NO. 2 April 1989, Japanese Unexamined Patent Publication No. 1 (1989)-216290, etc.). In this type of detector, a signal charge, produced in a radiation conductor irradiated with radiation, is collected by a charge collecting electrode and is temporarily stored in an electricity storage portion. The stored charge is converted to an electric signal and is output.

In addition, with respect to the charge-reading process of reading out a stored electric charge to the outside, there is a thin-film transistor (TFT) reading type which reads out an electric charge by scanning and driving a TFT connected to the electricity storage portion, an optical reading type which emits reading light (reading electromagnetic wave) to a detector and reads out an electric charge, and so on.

Furthermore, the applicant of this application has proposed an improved direct conversion type of solid radiation detector in Japanese Unexamined Patent Publication Nos. 10(1998)-232824 and 10(1998)-271374. The improved solid radiation detector is of a direct conversion and optical reading type and is formed by stacking (1) a recording photoconductive layer which exhibits photoconductivity by receiving the emission of recording radiation directly or indirectly, (2) a charge transfer layer which operates as substantially an electric conductor with respect to an electric charge of the same polarity as a latent image charge and also operates as substantially an insulator with respect to a transfer charge of the opposite polarity from the latent image charge, and (3) a reading photoconductive layer which exhibits photoconductivity by receiving the emission of a reading electromagnetic wave, in the recited order. In this improved type of detector, a signal charge (latent image charge) carrying image information is stored in the interface (electricity storage portion) between the recording photoconductive layer and the charge transfer layer. Also, electrodes (first and second conductive layers) are stacked on both sides of these 3 layers. The recording photoconductive layer, the charge transfer layer, and the reading photoconductive layer form the major part of the solid radiation detector in this type.

In photographing a radiation image, incidentally, a predetermined voltage is applied across the above-mentioned detector (which is, for example, a solid detector such as a photoelectric conversion element) to emit radiation, whereby an electric charge representing radiation-image information is stored in the electricity storage portion. On the other hand, after photographing, the application of voltage is stopped, or a standby voltage less than the above-mentioned predetermined voltage is applied. In this way, the electric charge stored in the electricity storage portion is held and the occurrence of dark current, which will be caused by continuing to apply the aforementioned predetermined voltage, is prevented.

In the case of using the optical reading type detector, there are cases where preexposure light is emitted to the reading electrode side to remove unnecessary electric charges stored in the electricity storage portion before the emission of recording light (which unnecessary electric charges include (1) a residual electric charge left without being read out after electric charges in the electricity storage portion have been read out, (2) dark current which occurs as voltage is applied to the device, and so on), as described in the above-mentioned Japanese Unexamined Patent Publication No. 10(1998)-271374.

Some of the direct conversion type detectors can perform recording immediately after dc voltage has been applied between both ends of the detector to form a predetermined electric field within the detector, as described in the above-mentioned Japanese Unexamined Patent Publication No. 10(1998)-271374, and others need to perform real recording after the detector has been pre-charged by primary exposure before recording, as described in "23027 Method and device for recording and transducing an electromagnetic energy pattern (Research Disclosure, June 1983)", for example.

Furthermore, for instance, as described in Japanese Unexamined Patent Publication Nos. 61(1986)-244176 and 9(1997)-206293, some of the light conversion type detectors need to supply a predetermined electric charge to the electricity storage portion in advance to fully charge the electricity storage portion prior to photographing.

However, for example, the above-mentioned U.S. Pat. No. 5,514,873 discloses only that with respect to a housing having a solid radiation detector (radiation converter), memory, an energy source, and a radio transmitter, the supply of energy to the converter is performed from the outside by radio. There is no description of the application of voltage to the detector and the timing of emitting radiation. Therefore, what is disclosed in this reference alone can neither necessarily store an electric charge in the electricity storage portion with reliability nor prevent dark current.

Also, the above-mentioned U.S. Pat. No. 5,354,982 discloses that the voltage applied to the device is lowered after the generation of a latent image in order to hold the latent image, but has the disadvantage that if the application of voltage is continued, a signal-to-noise (S/N) ratio will be reduced by the storage of dark current.

Furthermore, the above-mentioned Japanese Unexamined Patent Publication No. 8(1996)-271374 discloses that the X-rays transmitted through the solid radiation detector are detected with an X-ray sensor provided behind the detector and, based on the result of detection, the amount of the transmitted X-rays is controlled. However, there is no description as to how the timing of emitting the X-rays is controlled. Therefore, what is disclosed in this reference alone can neither always store an electric charge in the electricity storage portion reliably nor prevent dark current.

In the conventional apparatuses, the application of voltage to the detector, the emission of radiation, the emission of preexposure light, primary exposure, and the charging start and stop of the electricity storage portion are not always operated at proper timings. For this reason, dark current will increase and an unnecessary electric charge will not be removed, and consequently, there is a problem that the noise in an image signal output from the detector will increase and therefore the S/N ratio in the reproduced image will be reduced.

SUMMARY OF THE INVENTION

The present invention has been made in view of the aforementioned problems found in the prior art. Accordingly, the primary object of the present invention is to provide a radiation-image photographing method and apparatus which is capable of performing the application of voltage to the solid radiation detector, the emission of recording radiation or preexposure light, etc. at appropriate timings.

The appropriate timings of the start and stop of volt.age application to the solid radiation detector, the start and stop of radiation emission, and the start and stop of emission of an electromagnetic wave for preexposure are as follows. To store an electric charge produced by the emission of recording radiation in the electricity storage portion of the solid detecting element, a predetermined voltage has to be applied across the detector, so it is desirable to start the emission of radiation immediately after the application of voltage to the detector or after the detector has become stable since the application of voltage. That is, it is desirable that the start of voltage application and the start of radiation emission be performed at almost the same time.

From the viewpoint of the prevention of the occurrence of dark current after photographing, it is desirable that the voltage across the detector be stopped or switched to standby voltage in a short time period after the stop of radiation emission. That is, it is desirable that the stop of voltage application and the stop of radiation emission be performed at almost the same time.

On the other hand, in performing preexposure in the case of using an optical reading type detector, it is desirable, from the viewpoint of the removal of an unnecessary electric charge in addition to the above-mentioned timings, that preexposure be started near the start of voltage application to the detector. That is, it is desirable that the application of voltage to the detector and the start of preexposure light emission be performed at almost the same time.

Similarly, from the viewpoint of the removal of an unnecessary electric charge, preexposure is continued up to just before the start of radiation emission. In other words, it is desirable to emit radiation within a short time period after the stop of preexposure. That is, it is desirable that the stop of preexposure light emission and the start of radiation emission be performed at almost the same time.

Furthermore, in the case of using a direct conversion type detector that requires primary exposure, it is desirable to start primary exposure near the application of voltage to the detector and start the emission of radiation after the completion of pre-charging (full charging). That is, it is desirable that at least the stop of primary exposure and the start of radiation emission be performed at almost the same time.

The present invention renders it possible to perform the start of voltage application and the start of radiation emission and the like automatically at almost the same time. More specifically, a first radiation-image photographing method according to the present invention is a radiation-image photographing method for obtaining radiation-image information of a subject, the method comprising the steps of:

detecting radiation transmitted through the subject by a solid radiation detector having a plurality of solid detecting elements; and performing (1) start of voltage application to the solid radiation detector, which is required for storing an electric charge representative of the radiation-image information in the solid detecting elements, and start of the radiation emission and/or (2) stop of the voltage application and stop of the radiation emission at almost the same time.

A second radiation-image photographing method according to the present invention is a radiation-image photographing method for obtaining radiation-image information of a subject, the method comprising the steps of:

detecting radiation transmitted through the subject by a solid radiation detector having a plurality of solid detecting elements; and performing (1) start of voltage application to the solid radiation detector, which is required for storing an electric charge representative of the radiation-image information in the solid detecting elements, and start of an electromagnetic wave emission for preexposure prior to the detection and/or (2) stop of the electromagnetic wave emission and stop of the radiation emission at almost the same time.

A first radiation-image photographing apparatus according to the present invention is a radiation-image photographing apparatus for obtaining radiation-image information of a subject, the apparatus comprising:

a radiation source for emitting radiation;

a solid radiation detector for detecting the radiation transmitted through the subject, the detector having a plurality of solid detecting elements which are driven by voltage-applying means; and control means for controlling the radiation source and the voltage-applying means so that (1) start of voltage application to the solid radiation detector, which is required for storing an electric charge representative of the radiation-image information in the solid detecting elements, and start of the radiation emission and/or (2) stop of the voltage application and stop of the radiation emission are performed at almost the same time.

In a preferred form of the first radiation-image photographing apparatus, the apparatus further comprises detection means for detecting the presence of the emission of the radiation, and the control means starts the application of the voltage when the detection means detects that the emission of the radiation is present, and/or stops the application of the voltage when the detection means detects no emission of the radiation after the radiation has been emitted.

As the detection means for detecting the presence of the emission of recording radiation, any type of detection means may be used, as long as it is able to detect the presence of radiation, transmitted through a subject, and incident on the detector, or detect what is in a corresponding relationship with the radiation. The detection means is not limited to detecting radiation itself transmitted through a subject, but may be any detector which detects radiation emitted from the radiation source corresponding to the radiation incident on the detector or may be any detector that detects light issuing from the detector irradiated with radiation. For instance, a photo timer, a photodiode and the like are preferred. Note that because current flows in the detector when recording radiation is emitted to the detector, the detector itself can function as the detection means for detecting the presence of the emission of radiation.

A second radiation-image photographing apparatus according to the present invention is a radiation-image photographing apparatus for obtaining radiation-image information of a subject, the apparatus comprising:

a radiation source for emitting radiation;

a solid radiation detector for detecting the radiation transmitted through the subject, the detector having a plurality of solid detecting elements which are driven by voltage-applying means; and preexposure means for emitting an electromagnetic wave for preexposure which is performed prior to the detection;

wherein the voltage-applying means and the preexposure means are controlled so that start of voltage application to the solid radiation detector, which is required for storing an electric charge representative of the radiation-image information in the solid detecting elements, and start of the electromagnetic wave emission are performed at almost the same time and/or the radiation source and the preexposure means are controlled so that stop of the electromagnetic wave emission and start of the radiation emission are performed at almost the same time.

In a preferred form of the second radiation-image photographing apparatus, the apparatus further comprises detection means for detecting the presence of the emission of the electromagnetic wave, and the control means starts the application of the voltage when the detection means detects that the emission of the electromagnetic wave is present, and/or starts the emission of the radiation when the detection means detects no emission of the electromagnetic after the electromagnetic wave has been emitted.

The "emission of recording radiation" in the above-mentioned methods and apparatuses means that the radiation representative of the radiation-image information on a subject, emitted from the radiation source and transmitted through the subject, is emitted to the detector.

The "application of voltage to the solid radiation detector which is required for storing an electric charge representative of radiation-image information in the solid detecting elements" means that necessary voltage is applied to the detector to store an electric charge representative of radiation-image information, generated in the charge generating portions of the solid detecting elements of the detector by emitting the recording radiation to the detector, in the electricity storage portions of the solid detecting elements. The application of voltage is not limited to the application of a desired voltage to a solid detecting element such as a photoelectric conversion element but includes the application of a desired voltage to other portions of the detector necessary for the aforementioned storage.

The "emission of an electromagnetic wave for preexposure" means emitting an electromagnetic wave other than recording light and reading light to the recording surface side or reading surface side of the detector prior to the emission of the recording light to the detector The phrase "almost the same time" in the above-mentioned methods and apparatuses means the relation of time that the start and stop of voltage application to the solid radiation detector, the start and stop of radiation emission, and the start and stop of electromagnetic wave emission for preexposure are performed at the aforementioned respective appropriate timings. The phrase "almost the same time" is sufficient if it is the above-mentioned appropriate timing, and does not always need to be at exactly the same time. Note that the detector, which is used in the method and apparatus of the present invention, may be of any type and can use detectors of various types, such as the above-mentioned light conversion type, direct conversion type, TFT reading type, optical reading type, improved direct conversion type which is a combination of them, and the like. For example, the appropriate timings of the start of voltage application and the start of radiation emission vary depending on detectors to be used. Therefore, it is a matter of course that the application of voltage and the like need to be performed at appropriate timings in accordance with a detector to be used.

Here, the timing control (time management) method for performing the start of voltage application and the start of radiation emission and the like at almost the same time may be any method, if it can automatically perform start and stop operations so that the start of voltage application and the start of radiation emission and the like are performed at the above-mentioned appropriate timings. For instance, based on a photographing start instruction from an operator, a timer can be started so that the start and stop of voltage application, emission of radiation and the like are performed at respective set times.

According to the first radiation-image photographing method and apparatus, respective timings are caused to automatically coincide with each other so that the start of voltage application to the solid radiation detector and the start of recording radiation emission are performed at almost the same time. Therefore, the electric charge produced by the emission of recording radiation can be stored in the electricity storage portion with reliability and the storage of an unnecessary electric charge due to dark current before emission can be prevented.

In addition, if respective timings are caused to automatically coincide with each other so that the stop of voltage application and the stop of recording radiation emission are performed at almost the same time, an unnecessary electric charge can be prevented from being stored after photographing. With this control, the S/N ratio during read operation is enhanced.

According to the second radiation-image photographing method and apparatus, respective timings are caused to automatically coincide with each other so that the start of voltage application to the solid radiation detector and the start of recording radiation emission are performed at almost the same time, or so that the stop of voltage application and the stop of radiation emission are performed at almost the same time. Therefore, an electric charge corresponding to the ray amount of the recording radiation can be stored after an unnecessary electric charge remaining within the detector has been removed.

According to the methods and apparatuses of the present invention, as described above, the possibility of giving rise to the problems of the increase of dark current and an unremoved unnecessary electric charge is reduced, so that a S/N ratio in an image, reproduced based on an image signal output from the detector, can be improved compared with manual operation.

The conventional apparatus, as in the apparatuses disclosed in the above-mentioned U.S. Pat. Nos. 5,514,873 and 5,354,982, Japanese Unexamined Patent Publication No. 8(1996)-299316 and the like, does not necessarily perform operations at appropriate timing from the viewpoint of the occurrence prevention of dark current, removal of an unnecessary electric charge, and full charging, whereas the present invention can reduce the possibility of increasing noise in an image signal and can improve a S/N ratio in an reproduced image, because respective timings are caused to automatically coincide with each other so that the application stop of voltage and the emission stop of recording radiation are performed at nearly the same time.

BRIEF DESCRIPTION OF THE DRAWINGS

The present invention will be described in further detail with reference to the accompanying drawings wherein.

DESCRIPTION OF THE PREFERRED EMBODIMENTS

Figure 1:
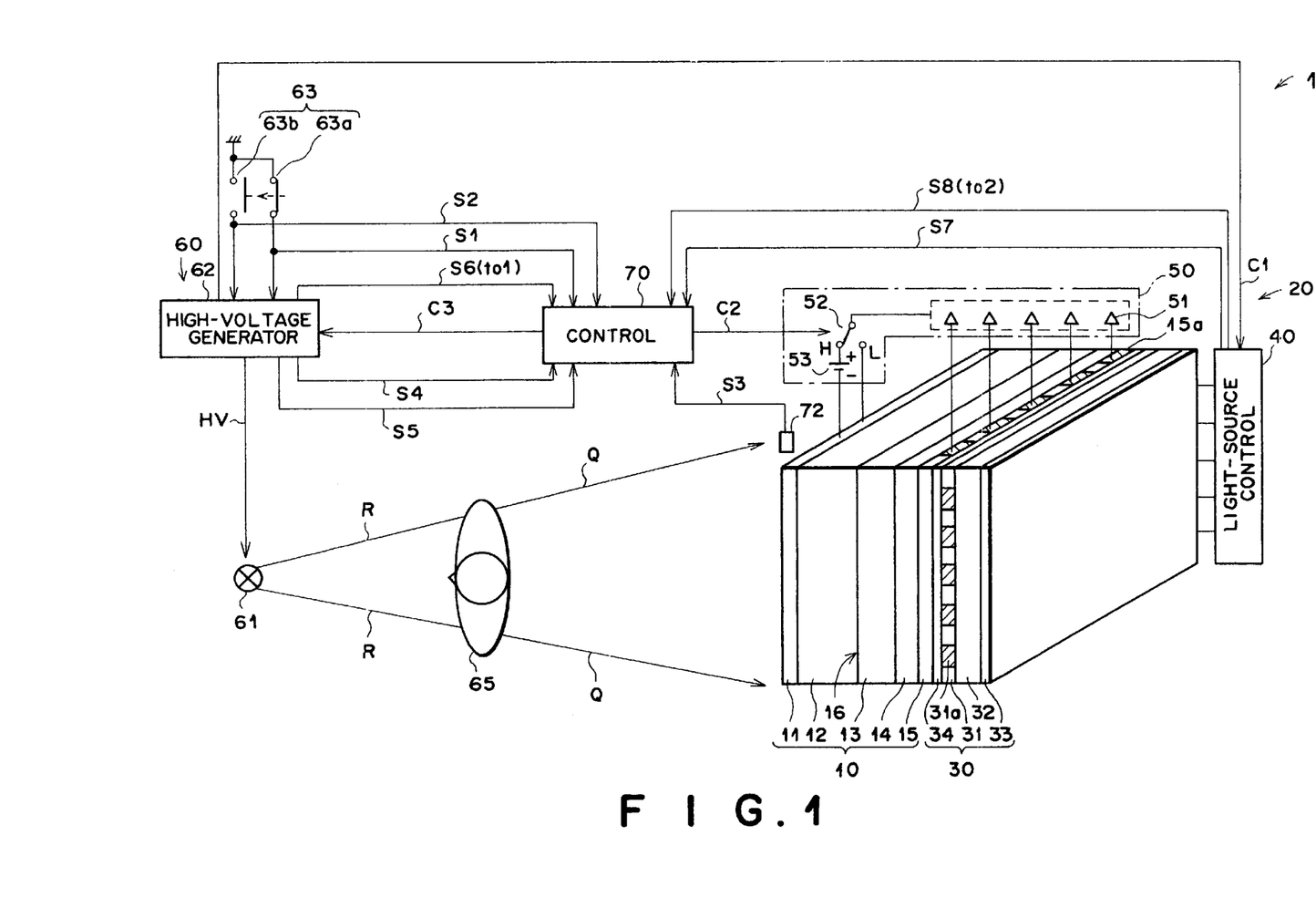
FIG. 1 is a schematic diagram showing a radiation image photographing-reading apparatus to which a radiation-image photographing method and apparatus according to the present invention is applied.

Referring now in greater detail to the drawings and initially to FIG. 1, there is shown a radiation image photographing-reading apparatus 1 to which a radiation-image photographing method and a radiation-image photographing apparatus according to the present invention are applied. The radiation image photographing-reading apparatus 1 has a reading section 20 and a radiation emitting section 60. The reading section 20 comprises a solid radiation detector 10, a surface light source 30 stacked on the radiation detector 10, light-source control means 40 for controlling the surface light source 30, and a current detecting circuit 50 for reading out an electric charge on the radiation detector 10. These components are the same as those known in the prior art. The apparatus 1 taking advantage of the present invention further has control means 70 connected to both the current detecting circuit 50 and the radiation emitting section 60.

The radiation detector 10 is an electrostatic recording device of the improved direct conversion type (direct conversion and optical reading type) described in the aforementioned Japanese Unexamined Patent Publication No. 10(1998)-232824. Radiation for recording (e.g., X-rays or the like which will hereinafter be referred to as recording light) is transmitted through a subject 65 and incident onto a first conductive layer 11, so that an electric charge is produced within a recording photoconductive layer 12. The produced electric charge is stored as a latent image charge in an electricity storage portion 16 which is the interface between the recording photoconductive layer 12 and a charge transfer layer 13. Next, a second conductive layer 15 is scanned with an electromagnetic wave for reading (hereinafter called reading light), whereby an electric charge is produced within a reading photoconductive layer 14. The produced electric charge recombines with the aforementioned latent image charge, thereby generating current corresponding to the amount of the latent image charge. The second conductive layer 15 as a reading electrode is formed by a large number of line electrodes (shaded by oblique lines in FIG. 1) arrayed in stripe form. The line electrodes of the second conductive layer 15 will hereinafter be referred to as a stripe electrode 15 and each line electrode as an element 15a.

The surface light source 30 is an electroluminescent (EL) body comprising a first conductive layer 31, an EL layer 32, and a second conductive layer 33, and as described above, the surface light source 30 is stacked on the radiation detector 10. Between the stripe electrode 15 of the radiation detector 10 and the first conductive layer 31 of the surface light source 30, there is provided an insulating layer 34. The first conductive layer 31 of the surface light source 30 is formed by a large number of elements 31a (shaded by oblique lines in FIG. 1) arrayed in the form of a stripe, each element 31a being arrayed so as to cross each element 15a of the stripe electrode 15 of the detector 10. In this embodiment, the elements 15a and 31a cross at substantially right angles. In this way, a large number of line light sources 31a are arrayed in surface form. Each element 31a is connected to the light-source control means 40.

The light-source control means 40 applies a predetermined voltage between the element 31a and the opposite conductive layer 33. More specifically, the control means 40 individually applies voltage to the element 31a during reading and applies voltage to a plurality of or all elements 31a at the same time during preexposure. For instance, if a predetermined dc voltage is applied between each element 31a and the conductive layer 32, while the element 31a is being switched in sequence, EL light is issued from the EL layer 32 sandwiched between the element 31a and the conductive layer 33, and the EL light transmitted through the element 31a is utilized as reading light in the form of a line (hereinafter referred to as line light). That is, the surface light source 30 becomes equivalent to a large number of small line light sources arrayed in surface form, and by sequentially switching all the elements 31a from one end in the longitudinal of the stripe electrode 15 to the other end and emitting EL light, the entire surface of the stripe electrode 15 can be electrically scanned with the line light. Note that the longitudinal direction of the element 15a corresponds to a vertical scanning direction, while the extending direction of the line light corresponds to a horizontal scanning direction.

On the other hand, if voltage is simultaneously applied to a plurality of or all elements 31a, EL light is emitted substantially uniformly from the EL layer 32 over the entire surface of the stripe electrode 15 by this application of voltage. This EL light is utilized as an electromagnetic wave for pre exposure (hereinafter referred to as preexposure light). That is, the surface light source 30 is constructed to function not only as a reading light source but also as a preexposure light source.

A control signal C1 is input to the light-source control means 40. In response to this signal C1, the light-source control means 40 goes to a preexposure mode when the control signal C1 is low and goes to a recording light mode when the signal C1 is high. When the control signal C1 is in a high impedance state, no EL light is issued from the surface light source 30.

The current detecting circuit 50 has a multiplicity of current detecting amplifiers 51 corresponding in number to the elements 15a of the stripe electrode 15, the elements 15a being connected to the inverting input terminals of the current detecting amplifiers 51, respectively. The first conductive layer 11 of the radiation detector 10 is connected to one input of a voltage controlling switch 52 and the negative polarity of ac power source (voltage applying means) 53, and the positive polarity of the power source 53 is connected to the other input of the voltage controlling switch 52. Though not shown, the output of the voltage controlling switch 52 is connected in common with the non-inverting input terminals of the current detecting amplifiers 51. If line light as reading light is emitted from the surface light source 30 to the stripe electrode 15 side, the current detecting amplifiers 51 detect currents flowing in the elements 15a at the same time (in parallel). Note that the construction of the current detecting amplifier 51 is not related to the gist of the present invention and therefore a detailed description thereof is omitted. However, it is possible to adopt various kinds of construction known in the prior art (e.g., see FIG. 7 to be described later). It is a matter of course that the manner of connecting the voltage controlling switch 52, the power source 53, and the elements 15a differs from the aforementioned connecting manner, depending upon the construction of the current detecting amplifier 51.

The radiation emitting section 60 comprises a radiation source 61 for emitting radiation R, a high-voltage generator 62 for generating electric power which drives the radiation source 61, and a generator switch 63 connected to the high-voltage generator 62 to control photographing. The generator switch 63 is a two-stage switch consisting of a first generator switch 63a and a second generator switch 63b and is constructed such that unless the first generator 63a is on, the second generator switch 63b is not made on. The high-voltage generator 62 is provided with a timer by which the time $t_{01}$ of emitting recording light can be set.

Now, a description will be given of the operation in the case where in the radiation image photographing-reading apparatus 1 of the above-mentioned construction, the control means 70 does not function, i.e., in the case where the apparatus 1 is assumed to be the same as the aforementioned conventional apparatus.

Initially, prior to photographing, the control signal C1 input to the light-source control means 40 is made low (preexposure mode) and preexposure is performed, whereby an unnecessary electric charge stored in the electricity storage portion 16 is discharged. At this time, the voltage controlling switch 52 may be in any state.

Next, in recording an electrostatic latent image on the detector 10, the voltage controlling switch 52 is first switched to the power source 53 side so that the electric charge produced in the recording photoconductive layer 12 of the detector 10 can be stored in the electricity storage portion 16, and dc voltage is applied between the conductive layer 11 and the stripe electrode 15 by the power source 53, whereby the conductive layer 11 and the stripe electrode 15 are charged with electricity. Thereafter, the first generator switch 63a is made on and the high-voltage generator 62 is caused to generate high voltage HV. If the control signal C1 is caused to be in a high impedance state to stop preexposure and also the second generator switch 63b is made on, after a standby lamp (not shown) provided in the high-voltage generator 62 has been lit and the high voltage HV has become stable, the stable high voltage HV is supplied from the high-voltage generator 62 to the radiation source 61 and therefore radiation R is emitted from the radiation source 61. This radiation R is incident onto the subject 65, and the recording light Q, transmitted through the subject 65 and carrying the radiation-image information of the subject 65, is emitted to the detector 10 by the emission time $t_{01}$ set by the timer (not shown) of the high-voltage generator 62. Therefore, positive and negative charges are produced within the recording photoconductive layer 12 of the detector 10, and the negative charge of the two is concentrated on each element 15a of the stripe electrode 15 along a predetermined electric field distribution and is stored as a latent image charge in the electricity storage portion 16 which is the interface between the recording photoconductive layer 12 and the charge transfer layer 13. Because the amount of the latent image charge is substantially proportional to the amount of the emitted radiation, this latent image charge will carry an electrostatic latent image. On the other hand, the positive charge produced within the recording photoconductive layer 12 is attracted to the conductive layer 11 and recombines with a negative charge injected from the power source 53 and disappears.

Next, in reading out the electrostatic latent image from the detector 10, the control signal C1 is first made high (recording-light mode) and the voltage controlling switch 52 is connected to the conductive layer 11 side of the detector 10. While the element 31a is being switched in sequence, a predetermined dc voltage is applied between each element 31a and the conductive layer 33 by the light control means 40, and the entire surface of the detector 10 is electrically scanned with the line light issued from the EL layer 32.

With the scanning performed by the line light, positive and negative charges are produced within the photoconductive layer 14 on which the line light corresponding to the horizontal scanning position is incident. The positive charge of the two is attracted by the negative charge (latent image charge) stored in the electricity storage portion 16 and is rapidly moved within the charge transfer layer 13. The moved positive charge recombines with the latent image charge and disappears. On the other hand, the negative charge produced in the photoconductive layer 14 of the detector 10 recombines with a positive charge injected from the power source 53 into the conductive layer 15 and disappears. In this way, the negative charge stored in the detector 10 disappears due to recombination of charges, and due to the movement of the charge during this recombination of charges, current flows in the detector 10. This current is simultaneously detected by each current detecting amplifier 51 connected to the corresponding element 15a. The current flowing in the detector 10 during reading operation corresponds to the latent image charge, i.e., the electrostatic latent image, and therefore the electrostatic latent image is read out by detecting this current. That is, an image signal representing the electrostatic latent image can be acquired.

In the case where the apparatus of the present invention is assumed to be the same as the conventional apparatus, incidentally, the preexposure, recording, and reading operations are all performed based on the manual switching of switches and control signals by the operator and these operations are not always performed at proper timings from the aspect of the prevention of dark current, the removal of an unnecessary electric charge and the like. For this reason, for example, there is a problem that (1) it takes a long period of time until recording radiation is emitted from the stop of preexposure and (2) if dc voltage is still being applied across the detector 10 after the end of recording, then an unnecessary electric charge will be produced within the detector 10, the noise in the image signal output from the detector 10 will be increased, and the S/N ratio in the reproduced image will be reduced.

On the other hand, in the apparatus 1 of the above-mentioned construction taking advantage of the radiation-image photographing method and apparatus according to the present invention, the control means 70 is provided for performing timing control so that the start and stop of voltage application to the detector 10, the start and stop of preexposure light emission, and the start and stop of the recording light emission are performed at respective predetermined timings, and as the peripheral components, a sensor 72 for sensing the presence of recording light and the like are provided.

The control means 70 receives signals S1, S2 from the generator switches 63a, 63b, a signal S3 from the sensor 72, and a standby signal S4, emission end signal S5, and signal S6, which indicates the set emission time $t_{on}$ of emitting recording light, from the high-voltage generator 62. The control means 70 also outputs a control signal C1 to the light-source control means 40, a control signal C2 to the voltage controlling switch 52, and a control signal C3 to the high-voltage generator 62. When the control signal C2 is high, the voltage controlling switch 52 is switched to the power source 53 side and dc voltage is applied from the power source 53 across the detector 10 (i.e., between the conductive layer 11 and stripe electrode 15 of the detector 10). When the control signal C2 is in a high impedance state, on the other hand, the voltage controlling switch 52 is set to its neutral point, the positive polarity of the power source 53 goes to a floating state, and no voltage is applied to the detector 10. Furthermore, when the control signal C2 is low, the voltage controlling switch 52 is switched to the conductive layer 11 side of the detector 10. The high-voltage generator 62 supplies high voltage HV to the radiation source 61 when the control signal C3 is input as a logic high signal, and therefore the radiation source 61 is caused to emit radiation R.

The sensor 72 can use a photo timer which detects the amount of recording light (recording radiation). This sensor 72 may be provided integrally with or separately from the detector 10. The sensor 72 may detect the recording light Q transmitted through the subject 65, or may detect the radiation R emitted from the radiation source 61.

The control means 70 is provided with a timer (not shown) so that it can issue control signals C1 to C3 after the lapse of a predetermined time. Note that some of the control signals C1 to C3 are issued according to embodiments of a control method to be described later and therefore all the control signals C1 to C3 are not always issued. Also, some of the signals S1, S2, . . . S8 to be input the control signal 70 are issued according to the embodiments of the control method to be described later and therefore all the signals are not necessarily issued.

A description will hereinafter be given in detail of the method for controlling the timing of applying voltage, the timing of emitting preexposure light, and the timing of emitting recording light by the control means 70. Note that it is a matter of course that in performing these controls by the control means 70, the apparatus 1 performs operation differing from the above-mentioned conventional operation.

Initially, for the method of controlling timing so that the application start of voltage to the detector 10 and the emission start of radiation R, i.e., recording light Q are performed at almost the same time (hereinafter referred to as voltage-application/recording-light start control), a description will be made with reference to a timing chart shown in FIG. 2. Note that in the description here, a description of preexposure control is omitted.

Figure 2A:
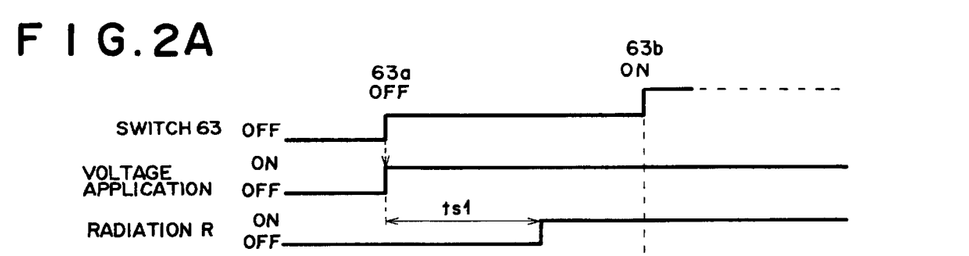
FIGS. 2A to 2D are timing diagrams showing methods which control timing so that the start of voltage application to the detector shown in FIG. 1 and the start of radiation (or recording light) emission are performed at almost the same time.

FIG. 2A is a timing chart showing a first method of the voltage-application/recording-light start control. This first method performs control, with the ON operation of the first generator switch 63a as a trigger. When the first generator switch 63a is first switched on manually by the operator, the high-voltage generator 62 generates high voltage HV (the same applies for the other methods to be described later) and the control means 70 senses that the control signal S1 has gone low and makes the control signal S2, which is issued to the voltage controlling switch 52, high. As a result, dc voltage is applied across the detector 10. After a predetermined set time $t_{s1}$ has elapsed since the control signal C2 was made high, the control means 70 makes the control signal C3, which is issued to the high-voltage generator 62, high. As a result, high voltage HV is supplied to the radiation source 61, which in turn emits radiation R.

Note that in this first method, the high-voltage generator 62 is constructed such that it rejects the depression (ON) of the second generator switch 63b. Therefore, even if the switch 63b were depressed before the lapse of the set time $t_{s1}$, no radiation R will be emitted from the radiation source 61. Also, it is preferable that the above-mentioned predetermined set time $t_{s1}$ be the time until high voltage HV becomes stable. For example, the set time $t_{s1}$ is set to about 2 sec.

Figure 2B:
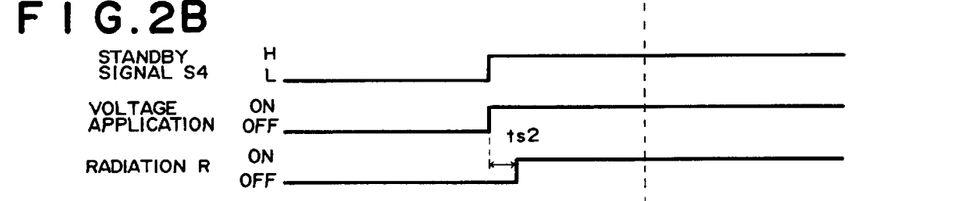

FIG. 2B is a timing chart showing a second method of the voltage-application/recording-light start control. This second method performs control, with the standby signal S4, which is issued when high voltage HV becomes stable, as a trigger.

The high-voltage generator 62 generates high voltage HV if the first generator switch 63a is depressed (ON), and makes the standby signal S4, which is issued to the control means 70, high after the high voltage HV has become stable. The control means 70 senses that the standby signal S4 has gone high, and then makes the control signal C2 high. As a result, dc voltage is applied across the detector 10. After a predetermined set time $t_{s2}$ has elapsed since the control signal C2 was made high, the control means 70 makes the control signal c3 high. As a result, high voltage HV is supplied to the radiation source 61, which in turn emits radiation R.

Note that in this second method, the high-voltage generator 62 is also constructed such that it rejects the depression (ON) of the second generator switch 63b. Therefore, even if the second generator switch 63b were depressed before the control signal C3 goes high, no radiation R will be emitted from the radiation source 61. In addition, because the standby switch S4 is made high after high voltage HV has become stable, the second method does not have to wait for high voltage HV to become stable, unlike the above-mentioned first method. Therefore, the start of radiation R emission may be almost the same as the control signal C2 is made high to apply dc voltage across the detector 10, and the above-mentioned predetermined set time $t_{s2}$ may be set to 0 sec.

Figure 2C:
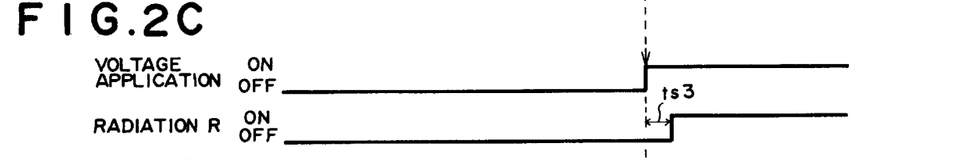

FIG. 2C is a timing chart showing a third method of the voltage-application/recording-light start control. This third method performs control, with the ON operation of the second generator switch 63b as a trigger. If the operator manually makes the second generator switch 63b on, the high-voltage generator 62 generates high voltage HV and the standby lamp (not shown) in the high-voltage generator 62 is lit. After high voltage HV has become stable, the second generator switch 63b is made on and the control means 70 makes the control signal C2 high. As a result, dc voltage is applied across the detector 10.

The control means 70 makes the control signal C3 high, after a predetermined set time $t_{s3}$ has elapsed since the control signal C2 was made high. This causes the radiation source 61 to emit radiation R.

Note that in this third method, the operator makes the second generator switch 63b on after high voltage HV has become stable. Therefore, the third method, as with the above-mentioned second method, does not need to wait for high voltage HV to become stable. As a result, the start of radiation R emission may be substantially the same as the control signal C2 is made high to apply dc voltage across the detector 10, and the above-mentioned predetermined set time $t_{s3}$ may be 0 sec.

Note that there are cases where the operator makes the second generator switch 63b on before high voltage HV becomes stable, so it is preferable not to emit radiation R before high voltage HV becomes stable, even when the operator depresses the switch 63b to make it on. For instance, the control means 70 can be constructed such that it monitors the standby signal S4, which is issued after high voltage HV has become stable, and does not make the control signal C3 high if it does not sense that the standby signal S4 has gone high, even after the above-mentioned predetermined set time $t_{s3}$ has elapsed.

Figure 2D:
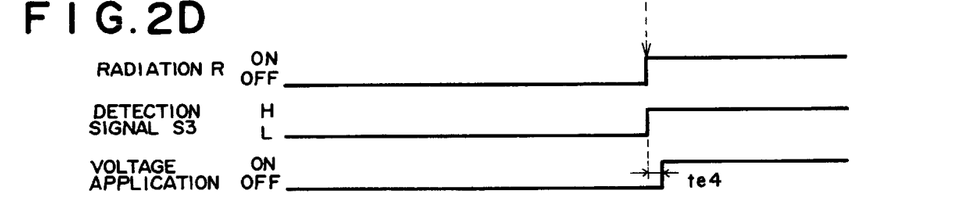

FIG. 2D is a timing chart showing a fourth method of the voltage-application/recording-light start control. This fourth method detects if the recording light Q has been emitted, in order to control the application of voltage to the detector 10. If the operator manually makes the second generator switch 63b on, the high-voltage generator 62 generates high voltage HV and the standby lamp (not shown) in the high-voltage generator 62 is lit. After high voltage HV has become stable, the second generator switch 63b is made on and therefore high voltage HV is supplied from the high-voltage generator 62 to the radiation source 61. The radiation source 61 emits radiation R, and the recording light Q transmitted through the subject 65 is emitted to the detector 10.

The sensor 72, for sensing the presence of the recording light Q, senses that the recording light R has been emitted, then makes the signal S3 high, and transfers that effect to the control means 70. The control means 70 senses that the signal S3 has gone high and makes the control signal C2 high after the lapse of a predetermined time period $t_{s4}$, preferably immediately. As a result, dc voltage is supplied across the detector 10.

That is, in this fourth method, unlike the above-mentioned first through third methods, the recording light Q is emitted prior to the application of voltage to the detector 10, and on sensing that the recording light Q has been emitted, voltage is applied across the detector 10. As described above, if voltage is not applied across the detector 10, an electric charge corresponding to the amount (intensity) of the recording light Q cannot be stored in the electricity storage portion 16, even if the recording light Q is emitted. However, in this method, an electric charge corresponding to emission can be stored substantially without causing any problem, because voltage is applied across the detector 10 in a short time period after the recording light Q has been emitted.

Note that instead of applying voltage across the detector 10 after it has been sensed by the sensor 72 that the recording light Q has been emitted, voltage may be applied across the detector 10 at the same time as the second generator switch 63b is made on in order to supply high voltage to the radiation source 61 from which radiation R is emitted.

In addition, it is possible that the operator will make the second generator switch 63b on before high voltage HV becomes stable. Therefore, it is preferable not to emit recording light Q before high voltage HV becomes stable, even when the second generator switch 63b is made on. For example, the high-voltage generator 62 can be constructed such that it refuses the depression (on) of the second generator switch 63b. Also, the control means 70 can be constructed such that it monitors the standby signal S4, which is issued after high voltage HV has become stable, and makes the control signal C3 high when the standby signal S4 goes high.

Next, for the method of controlling timing so that the stop of voltage application to the detector 10 and the stop of the recording light Q emission are performed at almost the same time (hereinafter referred to as voltage-application/recording-light stop control), a description will be made with reference to a timing chart shown in FIG. 3. Note that in the description here, a description of preexposure control is omitted.

Figure 3A:
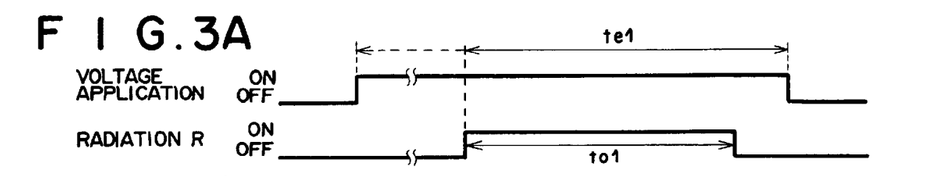
FIGS. 3A to 3D are timing diagrams showing methods which control timing so that the stop of voltage application to the detector and the stop of recording light emission are performed at almost the same time.

FIG. 3A is a timing chart showing a first method of the voltage-application/recording-light stop control. This first method controls the stop of voltage application to the detector 10, with the start of voltage application to the detector 10 or start of radiation R emission as a trigger.

First, according to the above-mentioned voltage-application/recording-light start control (the methods do not matter), voltage is applied across the detector 10 and the recording light Q is emitted to the detector 10. The high-voltage generator 62 continues to supply high voltage HG to the radiation source 61 until the set emission time $t_{o1}$ and then stops the supply of high voltage HV to the radiation source 61. As a result, the recording light Q is emitted to the detector 10 by the set emission time $t_{o1}$ and then the emission of the recording light Q is stopped. In addition, the control means 70 causes the control signal C2 to be in a high impedance state, after a predetermined set time $t_{e1}$ has elapsed since the application of voltage to the detector 10 or emission of recording light Q was started. As a result, the application of voltage to the detector 10 is stopped. Here, the above-mentioned predetermined set time $t_{e1}$ is set, from the viewpoint of the occurrence prevention of dark current after the end of photographing, so that the application of voltage to the detector 10 is stopped immediately after the stop of recording light Q emission. For instance, the set time $t_{e1}$ is set to a time period such that the application of voltage to the detector 10 is stopped in about 3 sec after the start of voltage application to the detector 10. If the set time $t_{e1}$ is set to such a time period, although it depends on the start timing of emitting the recording light Q, the application of voltage to the detector 10 can be stopped close to the time when the emission time $t_{o1}$ of emitting the recording light Q elapses.

Figure 3B:
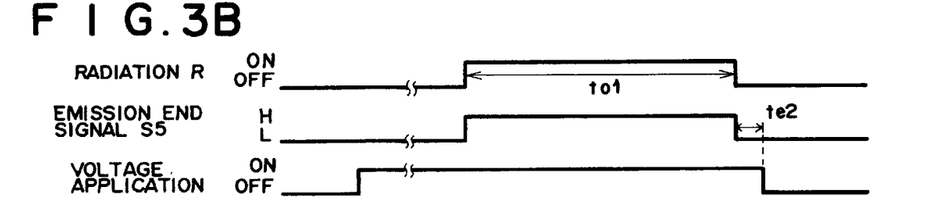

FIG. 3B is a timing chart showing a second method of the voltage-application/recording-light stop control. This second method differs from the above-mentioned first method in that stopping of the application of voltage to the detector 10 is controlled with a signal S5 for ending the emission of radiation R, which is emitted from the high-voltage generator 62, as a trigger. The high-voltage generator 62, as with the above-mentioned first method, supplies high voltage HG to the radiation source 61 by the set emission time $t_{o1}$ and then stops the supply of high voltage HV to the radiation source 61. The high-voltage generator 62 makes the emission end signal S5 high when supplying high voltage HV to the radiation source 61 and low when stopping the supply. If the control means 70 senses that the emission end signal S5 has changed from a high to a low, the control means 70 causes the control signal C2 to be in a high impedance state after the lapse of a predetermined set time $t_{e2}$. Here, the set time $t_{e2}$ is normally set to 1 set or less (preferably 0 sec) from the viewpoint of the preventing the occurrence of dark current after the end of photographing.

Figure 3C:
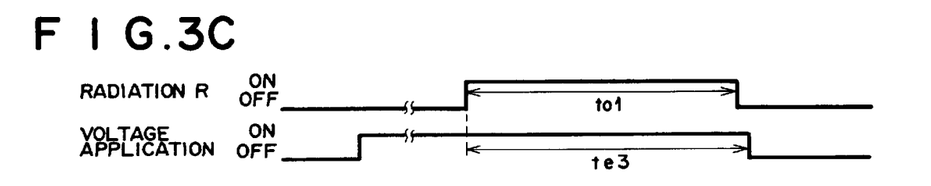

FIG. 3C is a timing chart showing a third method of the voltage-application/recording-light stop control. This third method differs from the above-mentioned first and second methods in that stopping of the application of voltage to the detector 10 is controlled based on a signal S6 indicating the emission time $t_{o1}$ of emitting the recording light R which is input from the high-voltage generator 62.

The control means 70 sets a time $t_{e3}$ from the start of the recording light Q emission to the stopping of the application of voltage to the detector 10, based on an input signal S6. Also, the control means 70 causes the control signal C2 to be in a high impedance state after the set time $t_{e3}$ has elapsed since the start of the recording light Q emission, thereby stopping the application of voltage to the detector 10. Here, the set time $t_{e3}$ is normally made $t_{o1}=t_{e3}$ from the viewpoint of preventing the occurrence of dark current after the end of photographing. Note that, depending on the above-mentioned methods of the voltage-application/recording-light start control, the start of the recording light Q emission may be performed based on the time when the control signal C3 is made high or when the signal S3 goes high.

Figure 3D:
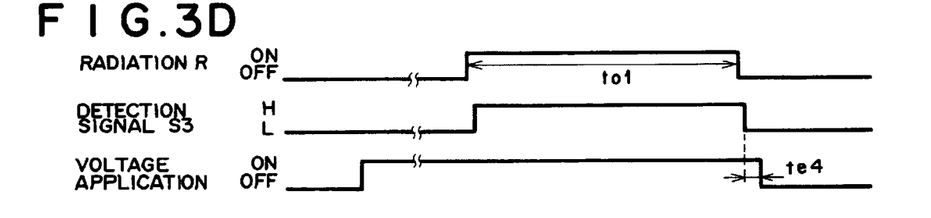

FIG. 3D is a timing chart showing a fourth method of the voltage-application/recording-light stop control. This fourth method detects the emission of the recording light Q and controls the application of voltage to the detector 10 and therefore corresponds to the fourth method of the voltage-application/recording-light start control. If the sensor 72 for detecting the presence of the recording light Q senses that the emission of the recording light Q has been stopped, the sensor 72 makes the signal S3 low and transfers that effect to the control means 70. The control means 70 senses that the signal S3 has changed from a high to a low, and the control means 70 causes the control signal C2 to be in a high impedance state after the lapse of a predetermined set time $t_{e4}$, thereby stopping the application of voltage to the detector 10. Here, the set time $t_{e4}$ is normally made 0 sec from the viewpoint of preventing the occurrence of dark current after the end of photographing.

Note that in the above-mentioned description of the voltage-application/recording-light stop control, while the emission time $t_{o1}$ has been set by the timer provided in the high-voltage generator 62, the emission time $t_{o1}$ may be set by the timer provided in the control means 70. In this case, the control means 70 makes the control signal C3 low after the lapse of the emission time $t_{o1}$, and in response to the control signal C3 being low, the high-voltage generator 62 stops the supply of high voltage HV to the radiation source 61.

Next, a description will be given of the method for controlling, in the apparatus 1, the timings of the start of voltage application and the like when preexposure is performed. This case differs from the above-mentioned description in that the start of preexposure light P emission and the stop of preexposure light P emission are further added between the start of voltage application to the detector 10 and the start of recording light Q emission. More specifically, timing is controlled so that the start of preexposure light P emission and the start of voltage application to the detector 10 are performed at almost the same time (this control will hereinafter be referred to as preexposure start control). Also, timing is controlled so that the stop of preexposure light P emission and the start of recording light Q emission are performed at almost the same time (this control will hereinafter be referred to as preexposure stop control). These methods will hereinafter be described in detail.

The preexposure start control can be performed by replacing, in the above-mentioned voltage-application/recording-light start control, the start of radiation R emission with the start of preexposure light P emission. For instance, in the above-mentioned first and second methods in the voltage-application/recording-light start control, the control signal C1 is made low instead of being made high and the light-source control means 40 is caused to be in a preexposure mode (see FIGS. 4A and 4B). Also, in the above-mentioned third method, when the second generator switch 63b is made on, the control signal C1 is made low and the light-source control means 40 is caused to be in a preexposure mode (see FIG. 4C). In the above-mentioned fourth method, the sensor 72 is constructed such that it detects the presence of the emission of preexposure light P. If the second generator switch 63b is made on, the emission of preexposure light P is first started. Then, if the sensor 72 detects that preexposure light P has been issued, the sensor 72 transfers that effect to the control means 70. The control means 70 starts the application of voltage to the detector 10 after the lapse of a predetermined time $t_{p4}$, preferably immediately (see FIG. 4D). Note that it is a matter of course that, from the viewpoint that preexposure is performed before the emission of recording light Q, the preexposure start control cannot be performed by sensing the emission of radiation R.

Figure 4A:
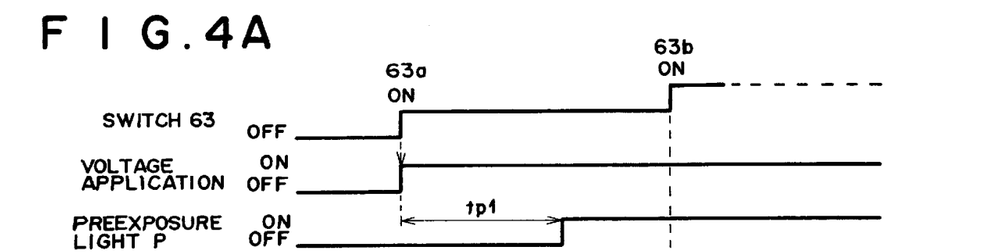
FIGS. 4A to 4D are timing diagrams showing methods which control timing so that the start of preexposure light emission and the start of voltage application to the detector are performed at almost the same time.
Figure 4B:
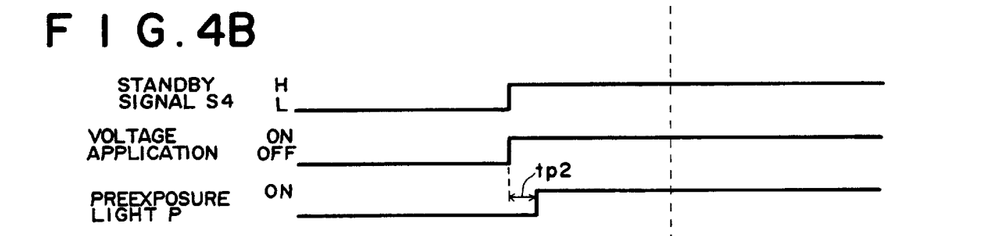
Figure 4C:
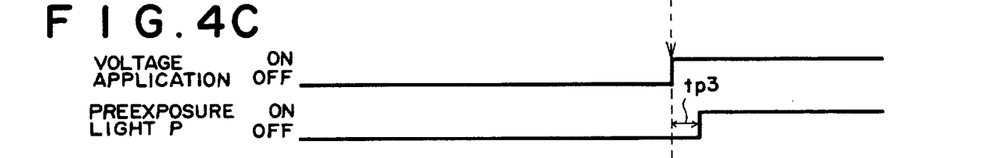
Figure 4D:
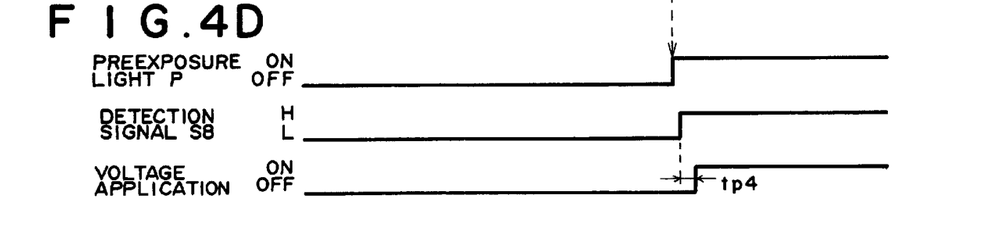

For the application of voltage to the detector 10 and the start of preexposure light P emission, any of the two may first be performed, and the application of voltage to the detector 10 and the start of preexposure light P emission in the above-mentioned description may be swapped over. For example, in the case of adopting the above-mentioned first method of the voltage-application/recording-light start control, the control signal C1 is made low, instead of making the control signal C2 high, and the light-source control means 40 is caused to be in a preexposure mode. On the other hand, instead of making the control signal C3 high, the control signal C2 is made high so that dc voltage is applied across the detector 10. In this way, after the second generator switch 63a has been made on, preexposure is started. Thereafter, dc voltage is applied across the detector 10 after the lapse of set time $t_{p1}$.

Figure 5A:
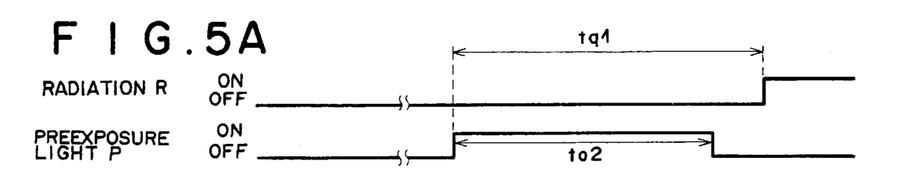
FIGS. 5A to 5F are timing diagrams showing methods which control timing so that the stop of preexposure light emission and the start of recording light emission are performed at almost the same time.
Figure 5B:
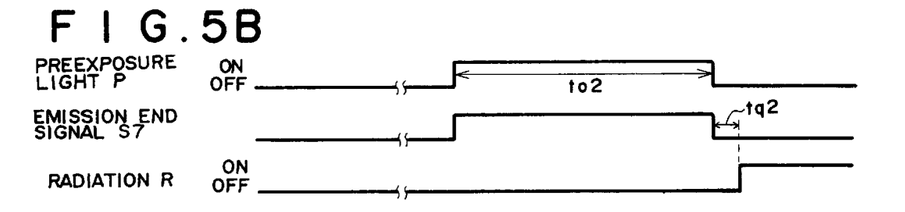
Figure 5C:
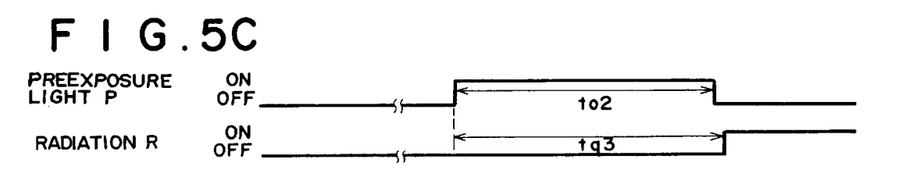
Figure 5D:
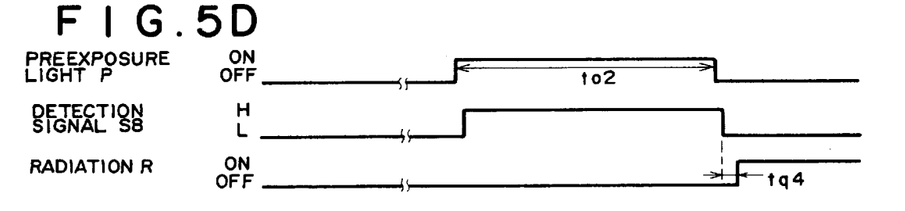

The preexposure stop control, on the other hand, can be performed by replacing, in the above-mentioned voltage-application/recording light stop control, the emission of radiation R with the emission of preexposure light P and also replacing the stopping of the application of voltage to the detector 10 with the start of radiation R emission. For example, in the above-mentioned first method of the voltage-application/recording-light stop control, instead of causing the control signal C2 to be in a high impedance state after the lapse of set time $t_{q1}$, the control signal C3 is made high so that radiation R is emitted from the radiation source 61 (see FIG. 5A). Note that the set time $t_{q1}$ may be started from either the start of preexposure light P emission or the application of voltage to the detector 10. Also, in the above-mentioned second method of the voltage-application/recording-light stop control, radiation R is emitted from the radiation source 61, with an emission end signal S7 for ending the emission of preexposure light P, which is issued from the light-source control means 40, as a trigger (see FIG. 5B). In the above-mentioned third method of the voltage-application/recording-light stop control, a time $t_{p3}$ from the emission start of preexposure light P to the emission start of radiation R is set based on a signal S8 indicating the emission time $t_{o2}$ of emitting preexposure light P which is input from the light-source control means 40, and radiation R is emitted from the radiation source 61, after the set time $t_{p3}$ has elapsed since the emission start of preexposure light P (see FIG. 5C). Furthermore, in the above-mentioned fourth method of the voltage-application/recording-light stop control, a sensor such as a photodiode for detecting the presence of the emission of preexposure light P is provided. After the sensor has sensed that the emission of preexposure light P has been stopped, radiation R is emitted from the radiation source 61 after the lapse of a predetermined set time $t_{p4}$ (see FIG. 5D).

Figure 5E:
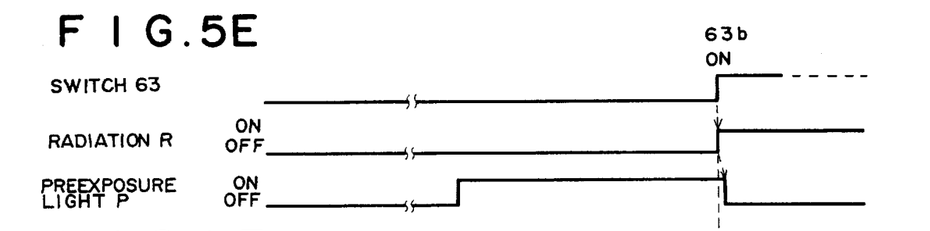
Figure 5F:
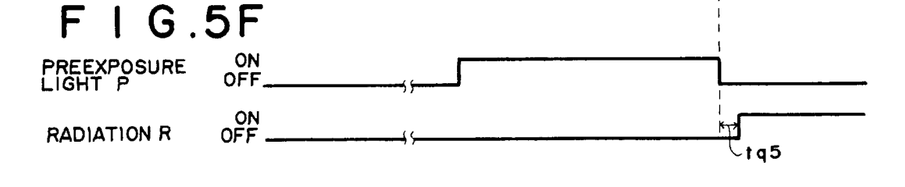

In addition, although differing from the above-mentioned forms which replace the voltage-application/recording-light stop control, by methods replacing the first and second methods of the voltage-application/recording-light start control (FIGS. 4A and B) the preexposure may be started and also stopped close to the time when the second generator switch 63b is made on. In this case, when the second generator switch 63b is made on, the emission of radiation R may be started and, immediately after that, preexposure may be stopped (see FIG. 5E). Alternatively, when the second generator switch 63b is made on, preexposure may be stopped, and immediately after that, or after the lapse of a predetermined set time tq5, the emission of radiation R may be started (see FIG. 5F).

For the respective methods of performing the voltage-application/recording-light start control, the voltage-application/recording-light stop control, the preexposure light start control, and the preexposure light stop control so that the start and stop of voltage application to the detector 10, the start and stop of preexposure light P emission, and the start and stop of recording light Q (or radiation R) emission are performed at the respective predetermined timings, a description thereof has been made in detail with a plurality of methods as examples. However, in the apparatus 1, an image signal is acquired, by selecting appropriate methods from among the plurality of methods, then starting and ending photographing at the combined timing, and reading out an electric charge stored in the detector 10.

Figure 6A:
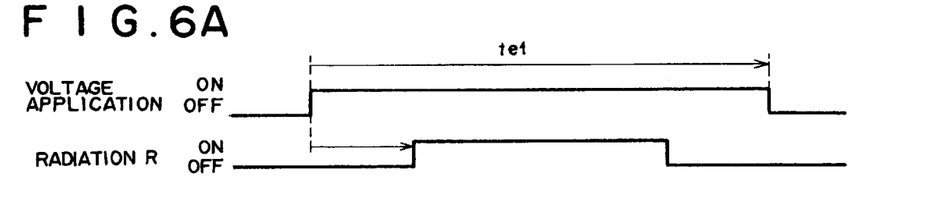
FIGS. 6A to 6C are timing diagrams showing methods which control the application of voltage to the detector, the emission of radiation, and the emission of preexposure light; and, FIG. 7 is a circuit diagram of a current detecting circuit in the case where the detector itself functions as a sensor for sensing the presence of recording light.
Figure 6B:
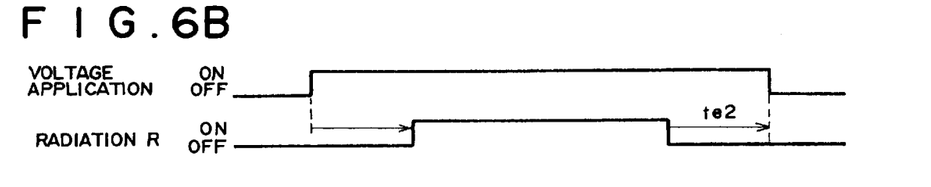
Figure 6C:
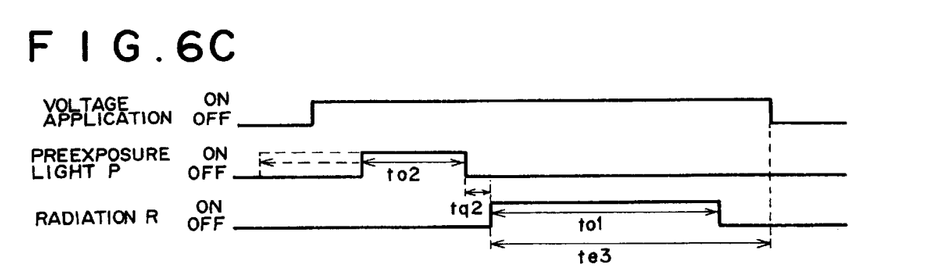

FIG. 6A is a timing diagram of the case of employing the above-mentioned first method (FIG. 3A) as the voltage-application/recording-light stop control. In this case, the emission of radiation R is started after the application of voltage to the detector 10. The voltage-application/recording-light start control may employ any of the first through third methods. FIG. 6B is a timing diagram of the case of employing the above-mentioned second method (FIG. 3B) as the voltage-application/recording-light stop control. As with the case of FIG. 6A, the emission of radiation R is started after the application of voltage to the detector 10, and the voltage-application/recording-light start control may employ any of the first through third methods. FIG. 6C is a timing diagram of the case of performing preexposure. In this case, the preexposure stop control uses the method shown in FIG. 5B, while the voltage-application/recording-light stop control uses the above-mentioned third method shown in FIG. 3C. The preexposure start control may employ any of the methods shown in FIGS. 4A to C.

While the preferred embodiments of the radiation image photographing method and apparatus according to the present invention have been described, the present invention is not limited to the embodiments, but many different embodiments are possible as long as they control timing so that any one of four methods is performed at almost the same time. (1) The start of voltage application to the solid radiation detector 10 and the start of radiation emission. (2) The stop of voltage application and the stop of radiation emission. (3) The start of preexposure light emission and the start of voltage application. (4) The stop of preexposure light emission and the start of radiation emission. Also, the present invention is not limited to the above-mentioned various timings, but many variations are possible within the scope of the invention so that appropriate timing is obtained according to a detector to be used.

For example, in the above-mentioned description, although the direct conversion and optical reading type has been used as the detector 10, the above-mentioned various timing control methods can similarly be applied to the case of using other types of detectors. For instance, in the case of using a direct conversion type detector which requires primary exposure, the above-mentioned preexposure light can be replaced with primary exposure light.

Also, in the case of using a solid radiation detector of light conversion type in which, prior to detection, a predetermined electric charge needs to be supplied to the electricity storage portion to fully charge the electricity storage portion with electricity, the above-mentioned set times $t_{s1}$, $t_{s2}$, and $t_{s3}$ can be set to the time required for full charging so that recording light is emitted after voltage has been applied across the detector to fully charge the electricity storage portion.

In addition, the sensor for detecting the presence of recording light is not limited to a sensor for detecting radiation. For example, a photodiode, which detects fluorescent light emitted from a fluorescent substance excited with radiation, can be used.

Although it has been described that the presence of recording light Q is detected by the sensor 72, a detector itself can function as the sensor 72. For example, in the case of using the optical reading type detector, as described above, one of the positive and negative charges produced in the recording photoconductive layer 12, which is not stored in the electricity storage portion 16, is attracted to the conductive layer on the side to which the recording light is emitted, and the attracted charge recombines with an electric charge injected from the power source 53 and disappears. In other words, when this charge recombination occurs, current (hereinafter referred to as recording current) flows in the detector 10 via the power source 53, so that the detector itself can be utilized as a sensor for detecting recording light. In addition, in view of a connection with the above-mentioned control means 70, it is more desirable to provide a conversion circuit, which converts the current detected by the detector itself to a voltage signal, in the above-mentioned current detecting circuit 50.

Figure 7:
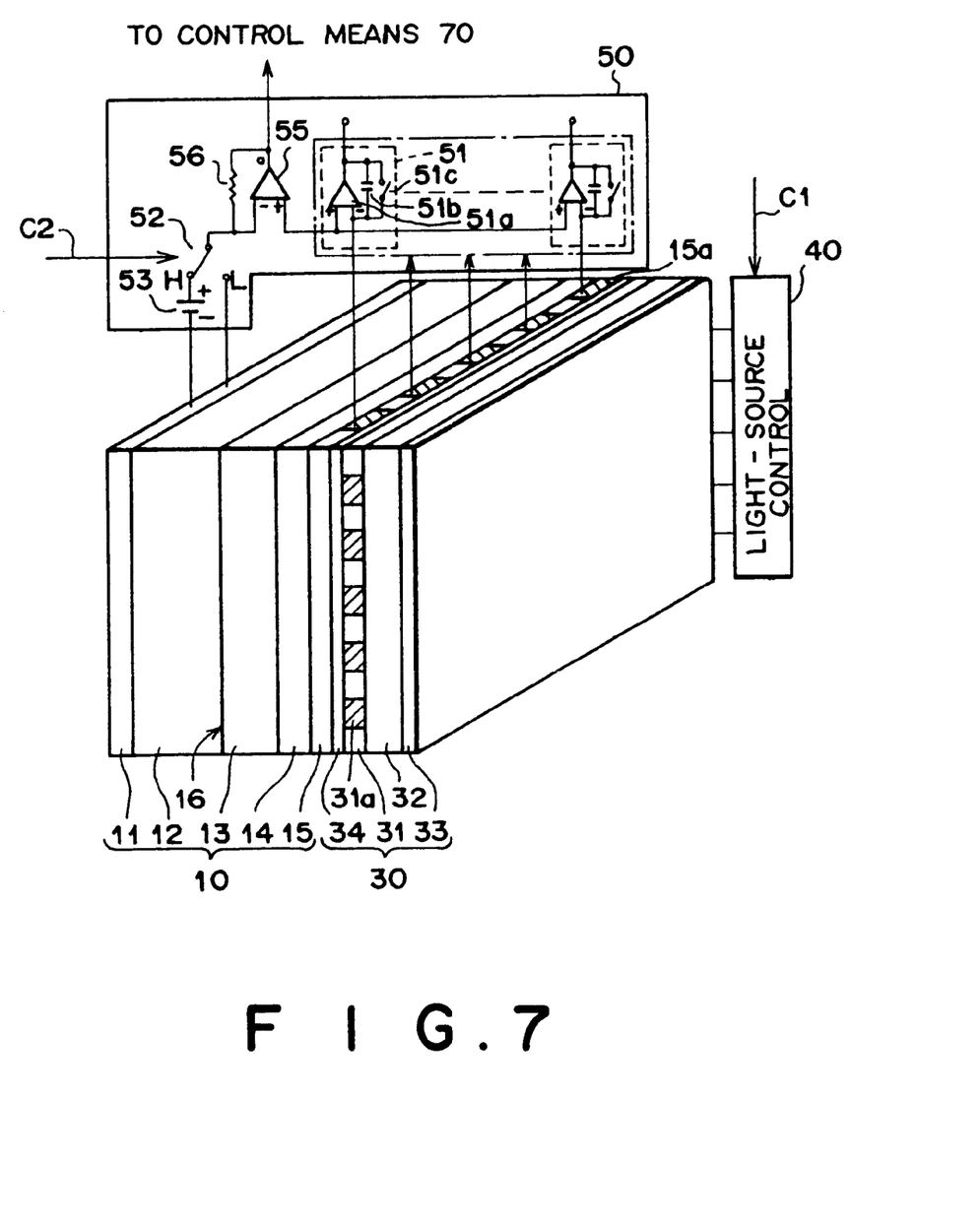

More specifically, as depicted in FIG. 7, an operational amplifier 55 is provided between the voltage controlling switch 52 and current detecting amplifiers 51. The inverting input terminal (−) of the operational amplifier 55 is connected to the output of the voltage controlling switch 52, while the non-inverting terminal (+) is connected in common with the non-inverting input terminals of the current detecting amplifiers 51. A load resistance 56 is connected between the non-inverting input terminal (−) and the output terminal (O) of the operational amplifier 55. A voltage signal, output from the output terminal (O) of the operational amplifier 55, is input to the above-mentioned control means 70.

Note that in the case of using a light conversion type detector, the detector itself can also function as a sensor for sensing recording light, because if a signal is read out at every predetermined cycle (e.g., 10 msec) from the detector, an electric charge, produced when recording light is emitted, can be read out.

What is claimed is:

1. A radiation-image photographing method for obtaining radiation image information of a subject, said method comprising the steps of:
    detecting radiation transmitted through said subject by a solid radiation detector having a plurality of solid detecting elements; and
    performing a combination of start and stop operations of voltage application to said solid radiation detector and radiation emission to the subject, wherein said combination of start and stop operations includes at least one of:
        (1) start of voltage application to said solid radiation detector, which is required for storing an electric charge representative of said radiation-image information in said solid detecting elements, and start of said radiation emission at almost the same time, and
        (2) stop of said voltage application and stop of said radiation emission at almost the same time.

2. A radiation-image photographing method for obtaining radiation-image information of a subject, said method comprising the steps of:
    detecting radiation transmitted through said subject by a solid radiation detector having a plurality of solid detecting elements; and
    performing a combination of start and stop operations of voltage application to said solid radiation detector, radiation emissions to the subject, and a preexposure electromagnetic wave, wherein said combination of start and stop operations includes at least one of: (1) start of voltage application to said solid radiation detector, which is required for storing an electric charge representative of said radiation-image information in said solid detecting elements, and start of emission of an electromagnetic wave for preexposure prior to said detection at almost the same time, and (2) stop of said electromagnetic wave emission and start of said radiation emission at almost the same time.

3. A radiation-image photographing apparatus for obtaining radiation-image information of a subject, said apparatus comprising:
    a radiation source for emitting radiation;
    a solid radiation detector for detecting said radiation transmitted through said subject, said detector having a plurality of solid detecting elements which are driven by voltage-applying means; and
    control means for controlling said radiation source and said voltage-applying means to perform a combination of start and stop operations of said voltage-applying means and said radiation source, wherein said combination of start and stop operations includes at least one of: (1) start of voltage application to said solid radiation detector, which is required for storing an electric charge representative of said radiation-image information in said solid detecting elements, and start of said radiation emission at almost the same time, and (2) stop of said voltage application and stop of said radiation emission are performed at almost the same time.

4. A radiation-image photographing apparatus for obtaining radiation-image information of a subject, said apparatus comprising:
    a radiation source for emitting radiation;
    a solid radiation detector for detecting said radiation transmitted through said subject, said detector having a plurality of solid detecting elements which are driven by voltage-applying means;
    detection means for detecting the presence of the emission of said radiation; and
    control means for controlling said voltage-applying means to perform start and stop operations of said voltage-applying means, wherein said start and stop operations includes at least one of: (1) starting of application of said voltage when said detection means detects that emission of said radiation is present and (2) stopping of the application of said voltage when said detection means detects no emission of said radiation after said radiation has been emitted.

5. The radiation-image photographing apparatus as set forth in claim 4, wherein said solid radiation detector itself functions as said detection means.

6. A radiation-image photographing apparatus for obtaining radiation-image information of a subject, said apparatus comprising:
    a radiation source for emitting radiation;
    a solid radiation detector for detecting said radiation transmitted through said subject, said detector having a plurality of solid detecting elements which are driven by voltage-applying means; and
    preexposure means for emitting an electromagnetic wave for preexposure which is performed prior to said detection;
    wherein said voltage-applying means and said preexposure means are controlled to perform a combination of start and stop operations of said voltage-applying means, said radiation source, and said preexposure means, wherein said combination of start and stop operations includes at least one of: (1) start of voltage application to said solid radiation detector, which is required for storing an electric charge representative of said radiation-image information in said solid detecting elements, and start of said electromagnetic wave emission are performed at almost the same time and (2) said radiation source and said preexposure means are controlled so that stop of said electromagnetic wave emission and start of said radiation emission are performed at almost the same time.

7. A radiation-image photographing apparatus for obtaining radiation-image information of a subject, said apparatus comprising:

a radiation source for emitting radiation;

a solid radiation detector for detecting said radiation transmitted through said subject, said detector having a plurality of solid detecting elements which are driven by voltage-applying means; and preexposure means for emitting an electromagnetic wave for preexposure which is performed prior to said detection;

detection means for detecting the presence of the emission of said electromagnetic wave; and control means for controlling a combination of start operations of said voltage-applying means and said radiation source, wherein said combination of start operations includes at least one of: (1) starting of said application of said voltage when said detection means detects that emission of said electromagnetic wave is present and (2) starting of the emission of said radiation when said detection means detects no emission of said electromagnetic wave after said electromagnetic wave has been emitted.

8. The method of claim 1 wherein said combination of control operations includes both of: (1) start of voltage application to said solid radiation detector, which is required for storing an electric charge representative of said radiation-image information in said solid detecting elements, and start of said radiation emission at almost the same time, and subsequently (2) stop of said voltage application and stop of said radiation emission at almost the same time.

9. The method of claim 2 wherein said combination of control operations includes both of (1) start of voltage application to said solid radiation detector, which is required for storing an electric charge representative of said radiation-image information in said solid detecting elements, and start of emission of an electromagnetic wave for preexposure prior to said detection at almost the same time, and (2) stop of said electromagnetic wave emission and start of said radiation emission at almost the same time.

10. The apparatus of claim 3, wherein said combination of start and stop operations includes both of: (1) start of voltage application to said solid radiation detector, which is required for storing an electric charge representative of said radiation-image information in said solid detecting elements, and start of said radiation emission at almost the same time, and subsequently (2) stop of said voltage application and stop of said radiation emission are performed at almost the same time.

11. The apparatus of claim 6, wherein the combination of start and stop operations of said voltage-applying means, said radiation source, and said preexposure means, wherein said combination of start and stop operations includes both of: (1) start of voltage application to said solid radiation detector, which is required for storing an electric charge representative of said radiation-image information in said solid detecting elements, and start of said electromagnetic wave emission are performed at almost the same time and (2) said radiation source and said preexposure means are controlled so that stop of said electromagnetic wave emission and start of said radiation emission are performed at almost the same time.

* * * * *